(12) United States Patent
Yamashita et al.

(10) Patent No.: US 8,142,006 B2
(45) Date of Patent: Mar. 27, 2012

(54) IMAGE RECORDING COMPOSITION, IMAGE RECORDING INK SET AND RECORDING APPARATUS

(75) Inventors: Yoshiro Yamashita, Kanagawa (JP); Ken Hashimoto, Kanagawa (JP); Kentaro Ageishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 452 days.

(21) Appl. No.: 12/325,595

(22) Filed: Dec. 1, 2008

(65) Prior Publication Data

US 2009/0231406 A1 Sep. 17, 2009

(30) Foreign Application Priority Data

Mar. 14, 2008 (JP) ................. 2008-066469

(51) Int. Cl.
*G01D 11/00* (2006.01)
(52) U.S. Cl. .......... 347/100; 347/95; 347/102; 347/103
(58) Field of Classification Search ................. 347/100, 347/95, 96, 102, 103; 106/31.6, 31.13, 31.27; 523/160, 161
See application file for complete search history.

(56) References Cited

U.S. PATENT DOCUMENTS

| | | | |
|---|---|---|---|
| 5,683,784 A | 11/1997 | Nakao et al. | |
| 6,001,466 A | 12/1999 | Noguchi et al. | |
| 6,136,382 A * | 10/2000 | Kamen et al. | 106/287.14 |
| 2001/0038409 A1 | 11/2001 | Yanagawa et al. | |
| 2001/0055047 A1 | 12/2001 | Ohsawa et al. | |
| 2001/0055728 A1 | 12/2001 | Shibata | |
| 2003/0068571 A1 | 4/2003 | Uehara et al. | |
| 2003/0165766 A1* | 9/2003 | Zhang et al. | 430/124 |
| 2005/0031348 A1 | 2/2005 | Choi et al. | |
| 2005/0031384 A1 | 2/2005 | Sohmiya et al. | |
| 2005/0110856 A1 | 5/2005 | Mouri et al. | |
| 2005/0259138 A1 | 11/2005 | Doi | |
| 2006/0164487 A1 | 7/2006 | Kadomatsu et al. | |
| 2007/0034152 A1 | 2/2007 | Nakagawa et al. | |
| 2007/0176995 A1 | 8/2007 | Kadomatsu et al. | |
| 2007/0296790 A1 | 12/2007 | Nakazawa et al. | |
| 2008/0045619 A1* | 2/2008 | Jackson et al. | 522/32 |
| 2008/0062241 A1 | 3/2008 | Yamashita et al. | |
| 2009/0318591 A1 | 12/2009 | Ageishi et al. | |

FOREIGN PATENT DOCUMENTS

| | | |
|---|---|---|
| CN | 1911532 | 2/2007 |
| JP | 5-229112 | 9/1993 |
| JP | 08-090900 | 4/1996 |
| JP | 08-311784 | 11/1996 |
| JP | 11-188858 | 7/1999 |
| JP | 11-235866 | 8/1999 |
| JP | 11-259913 | 9/1999 |
| JP | 2000-052640 | 2/2000 |
| JP | 2000-94654 | 4/2000 |
| JP | 2000-198185 | 7/2000 |
| JP | 2000-343808 | 12/2000 |
| JP | 2001-10114 | 1/2001 |
| JP | 2001-212956 | 8/2001 |
| JP | 2001-315426 | 11/2001 |
| JP | 2002-321443 | 11/2002 |
| JP | 2002-370347 | 12/2002 |
| JP | 2003-57967 | 2/2003 |
| JP | 2003-080746 | 3/2003 |
| JP | 2003-080837 | 3/2003 |
| JP | 2003-246135 | 9/2003 |
| JP | 2004-009523 | 1/2004 |
| JP | 2004-148530 | 5/2004 |
| JP | 2005-170036 | 6/2005 |
| JP | 2007-58952 | 3/2007 |
| JP | 2007-230232 | 9/2007 |
| JP | 2008-68429 | 3/2008 |
| JP | 2008-100501 | 5/2008 |

OTHER PUBLICATIONS

USPTO Office Action, U.S. Appl. No. 12/326,248; May 18, 2010.
USPTO Office Action, U.S. Appl. No. 12/326,248; Sep. 24, 2010.
USPTO Office Action, U.S. Appl. No. 12/326,248; Apr. 4, 2011.
Office Action dated Oct. 28, 2011 issued in U.S. Appl. No. 12/326,248.
Office Action dated Oct. 27, 2011 issued in U.S. Appl. No. 12/326,287.
Office Action dated Sep. 29, 2011 issued in U.S. Appl. No. 12/361,039.

* cited by examiner

*Primary Examiner* — Manish S Shah

(74) *Attorney, Agent, or Firm* — Fildes & Outland, P.C.

(57) ABSTRACT

An image recording composition including a curable material that is cured upon application of an external stimulus, and a cationic resin having a cationic functional group.

19 Claims, 4 Drawing Sheets

IMAGE RECORDING COMPOSITION, IMAGE RECORDING INK SET AND RECORDING APPARATUS

CROSS-REFERENCE TO RELATED APPLICATION

This application is based on and claims priority under 35 USC 119 from Japanese Patent Application No. 2008-066469 filed Mar. 14, 2008.

BACKGROUND

1. Technical Field

The present invention relates to an image recording composition, an image recording ink set and a recording apparatus.

2. Related Art

An inkjet recording system is one of recording systems for recording images, data, and the like with the use of ink. The principle of the inkjet recording system is such that an image is formed on a medium made of paper, cloth, or a film, by ejecting an ink in the form of a liquid or a melted solid through a nozzle, a slit, a porous film, or the like. Various methods of ejecting ink have been proposed, including a so-called charge-control system in which ink is ejected by means of an electrostatic attractive force; a so-called drop-on-demand system (pressure pulse system) in which ink is ejected by means of oscillating pressure of a piezoelectric element; a so-called thermal inkjet system in which ink is ejected by means of pressure generated by forming and growing air bubbles by a high temperature; and the like. By employing these systems, recorded materials of an image or data with an extremely high precision can be obtained.

In order to perform recording of an image or data with high precision on various recording media including permeable media and impermeable media, a method of recording an image onto an intermediate transfer member and then transferring the image onto a recording medium has been applied in the recording systems using an ink, including the aforementioned inkjet recording systems.

SUMMARY

According to an aspect of the invention, there is provided an image recording composition comprising a curable material that is cured upon application of an external stimulus, and a cationic resin having a cationic functional group.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be explained with reference to the drawings. The same denotations are given to the members having the same function in all drawings, and overlapping explanations may be omitted

First Exemplary Embodiment

Figure 1:
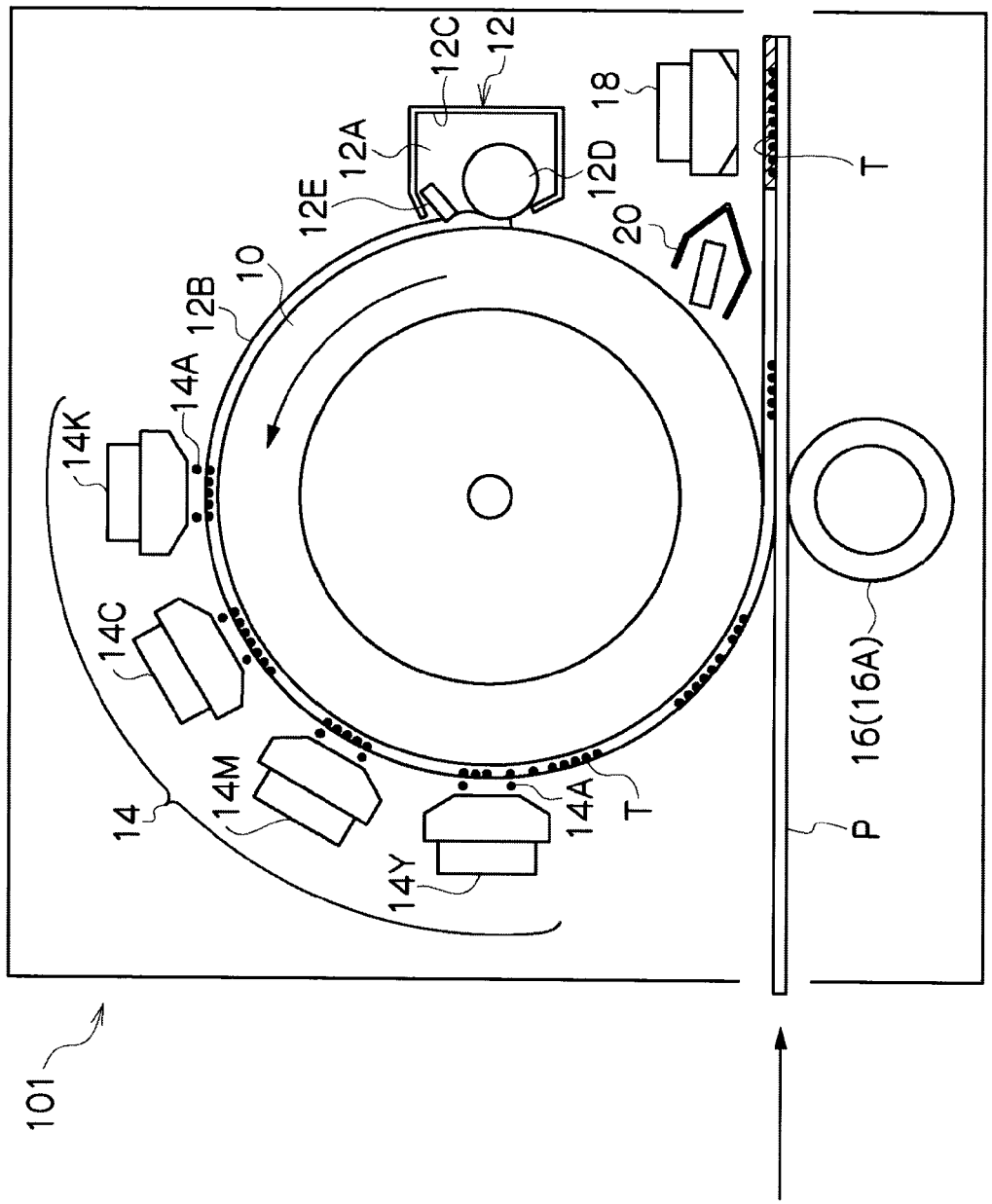
FIG. 1 is a configurational drawing showing a recording apparatus according to a first exemplary embodiment of the invention.

FIG. 1 is a configurational drawing showing a recording apparatus according to a first exemplary embodiment of the invention.

As shown in FIG. 1, a recording apparatus 101 according to a first exemplary embodiment includes, for example, an intermediate transfer drum 10; a supply unit 12 that forms, onto the intermediate transfer drum 10, a curable layer 12B by supplying an image recording composition 12A containing at least a curable material that is cured by an external stimulus (energy); an inkjet recording head 14 that forms an image T by ejecting ink droplets 14A onto the curable layer 12B; a transfer unit 16 that transfers the curable layer 12B, on which the image T is formed, onto a recording medium P by positioning the recording medium P on the intermediate transfer drum 10 and applying a pressure thereto; and a stimulus application unit 18 that applies a stimulus by which the curable layer 12B that has been transferred onto the recording medium P is cured.

Further, in the downstream of the transfer unit 16 in a direction in which the intermediate transfer drum 10 rotates may be positioned a cleaning unit 20 that removes a residue from the curable layer 12B remaining on the surface of the intermediate transfer drum 10, and other adhesion matters attaching to the intermediate transfer drum 10 such as paper powder from the recording medium P, and the like.

The intermediate transfer drum 10 may have, for example, a cylindrical substrate and a surface layer covering the surface of the cylindrical substrate. The intermediate transfer drum 10 may have a width (the length in an axial direction) that is equal to or wider than the width of the recording medium P.

The materials for the cylindrical substrate include, for example, aluminum, stainless steel (SUS), copper, and the like.

The materials for the surface layer include, for example, various kinds of resins (such as polyimide, polyamideimide, polyester, polyurethane, polyamide, polyether sulfone, and fluorine-based resin), various kinds of rubbers (such as nitrile rubber, ethylene propylene rubber, chloroprene rubber, isoprene rubber, styrene rubber, butadiene rubber, butyl rubber, chlorosulfonated polyethylene, urethane rubber, epichlorohydrin rubber, acrylic rubber, silicone rubber, and fluororubber), and the like. The surface layer may have a single layer structure or a laminated structure.

The supply unit 12 includes, for example, a supply roller 12D that supplies the image recording composition 12A to the intermediate transfer drum 10, and a blade 12E that regulates the thickness of the curable layer 12B formed from the supplied image recording composition 12A, in a housing 12C in which the image recording composition 12A is stored.

The supply roller 12D in the supply unit 12 may be in contact with the intermediate transfer drum 10 in a continuous manner, or may be positioned apart from the intermediate transfer drum 10. Further, the supply unit 12 may supply the image recording composition 12A to the housing 12C from an independent supply system (not shown) so that the image recording composition 12A can be continuously supplied.

Here, the "curable material that cures upon application of an external stimulus (energy)" contained in the image recording composition 12A refers to a material that is cured by an external stimulus to become a "curable resin". Specific examples of such materials include curable monomers, curable macromers, curable oligomers, and curable prepolymers. Details of these materials will be described later.

The structure of supply unit 12 is not limited to the above configuration, and may be those utilizing known supplying methods including application methods such as bar coater coating, spray coating, inkjet coating, air-knife coating, blade coating, and roll coating.

The inkjet recording head 14 includes, for example, recording heads for each color including a recording head 14K for ejecting an black ink, a recording head 14C for ejecting a cyan ink, a recording head 14M for ejecting a magenta ink, and a recording head 14Y for ejecting a yellow ink, positioned in this order from the upstream side in a direction in which the intermediate transfer drum 10 rotates. Of course, the structure of the recording head 14 is not limited to the above configuration, and may include only one of the recording heads 14K, 14C, 14M and 14Y.

Each recording head 14 is preferably, for example, a line-type inkjet recording head having a width equal to or wider than the width of a recording medium P, but may be a conventional scan-type inkjet recording head. The method of ejecting ink of each recording head 14 may be any method in which ink can be ejected, such as a piezo-electric element driving method and an heater element driving method.

Each recording head 14 may be arranged, for example, in series in the order of the recording head 14K, the recording head 14C, the recording head 14M and the recording head 14Y from the upstream side in a direction of rotation of the intermediate transfer drum 10.

Each recording head 14 may be arranged in such a manner that the distance between the surface of the intermediate transfer drum 10 and the nozzle surface of the head is, for example, from about 0.3 mm to about 0.7 mm. Further, each recording head 14 is arranged, for example, such that the longitudinal direction thereof intersects with the rotation direction of the intermediate transfer drum 10 (desirably in a perpendicular manner).

The transfer device 16 includes a pressure roll 16A which is arranged so that the pressure roll 16A is pressed against the intermediate transfer drum 10. The pressure roll 16A may be formed from, for example, materials similar to those used for the intermediate transfer drum 10.

A stimulus application unit 18 is selected in accordance with the kind of the curable material contained in the image recording composition 12A. Specifically, for example, when the curable material is a material that is curable upon irradiation with ultraviolet rays, an ultraviolet-ray irradiation unit that irradiates the image recording composition 12A (or the layer 12B formed from the image recording composition 12A) with ultraviolet rays is used as the stimulus application unit 18. When the curable material is a material that is curable upon irradiation with electron beams, an electron-beam irradiation unit that irradiates the image recording composition 12A (or the layer 12B formed from the curable material) with electron beams is used as the stimulus application unit 18. Furthermore, when the material is a material that is curable upon application of heat, a heat application unit that applies heat to the image recording composition 12A (or the layer 12B formed from the image recording composition 12A) is used as the stimulus application unit 18.

The ultraviolet-ray irradiation unit may be, for example, a metal halide lamp, a high-pressure mercury lamp, an ultra high-pressure mercury lamp, a deep ultraviolet-ray lamp, a lamp that excites a mercury lamp externally with a microwave ultraviolet laser without using an electrode, a xenon lamp, a UV-LED, and the like.

The conditions for the irradiation with ultraviolet rays are not specifically limited as long as the image recording composition 12A containing a material that is curable upon irradiation with ultraviolet rays (or the layer 12B formed from the image recording composition 12A) is fully cured, and may be selected depending on the type of the material that is curable upon irradiation with ultraviolet rays or the thickness of the layer 12B formed from the image recording composition 12A, and the like. For example, the irradiation may be conducted with a high-pressure mercury lamp at an output power density of 120 W/cm for 2 s.

The electron-beam irradiation unit may be, for example, a scan-type unit or a curtain-type unit. The curtain-type electron-beam irradiation unit is a device in which thermoelectrons generated at a filament is drawn out by a grid in a vacuum chamber, which are accelerated to form an electron current by a high voltage (for example, 70 kV to 300 kV), and the electron current passes through a window foil to be discharged into the atmosphere. The wavelength of the electron beams is generally shorter than 1 nm, and the energy of the electron beams can be up to several MeVs, but the electron beams having a wavelength in an order of pm and energy of several ten to several hundred keV are normally used.

The conditions for irradiation with the electron beams are not specifically limited as long as the image recording composition 12A (or the curable layer 12B formed from the image recording composition 12A) is fully cured, and may be selected depending on the type of the electron beam-curable material, the thickness of the curable layer 12B, and the like. For example, the irradiation may be conducted with an electron beam quantity of from 5 to 100 kGy levels.

The heat application unit may be, for example, a halogen lamp, a ceramic heater, a Nichrome-wire heater, a microwave heater, an infrared-ray lamp, and the like. A heating device employing an electromagnetic induction method is also applicable.

The conditions for applying heat are not specifically limited as long as the image recording composition 12A containing a material that can be cured by heat (or the curable layer 12B formed by the image recording composition 12A) is fully cured, and may be selected depending on the type of the material that can be cured by heat, the thickness of the curable layer 12B, and the like. For example, the application of heat may be conducted at a temperature of 200° C. for 5 minutes, in the atmosphere.

The above-mentioned state that is "fully cured" refers to a state in which transfer does not occur even when a sheet of paper having permeability (plain paper) is put on the curable layer 12B, which has been cured by the stimulus application unit 18, and a load of 200 g is applied thereon.

The recording medium P may be either permeable medium (for example, plain paper, coat paper and the like) or non-permeable medium (for example, art paper, resin film, and the like). However, the recording medium is not restricted thereto and may be other industrial products, such as a semiconductor substrate.

In the following, an image recording process using the recording apparatus 101 according to the present exemplary embodiment will be explained.

In the recording apparatus 101 according to the present exemplary embodiment, the intermediate transfer drum 10 is driven to rotate, and the image recording composition 12A is supplied onto the surface of the intermediate transfer drum 10 from the supply unit 12 to form a curable layer 12B.

The thickness of the curable layer 12B is not specifically restricted, but may be from 1 μm to 50 μm, preferably from 2 μm to 20 μm, and more preferably from 3 μm to 10 μm. When the image density is low (the amount of ink ejected is small, such as from 0.1 g/m² to 1.5 g/m²), the thickness of the curable layer 12B is preferably regulated to a minimum level (for example, from 1 μm to 5 μm), and when the image density is high (the amount of ink ejected is large, such as from 4 g/m² to 15 g/m²), the thickness is preferably regulated to a thickness of, for example, from 4 μm to 10 μm.

Further, for example, when the curable layer 12B has a thickness through which ink droplets 14A do not reach the bottom of the layer 12B, the portion in which the ink droplets 14A exist in the curable layer 12B will not be exposed after the transferring of the layer 12B onto the recording medium P, and thus the region in which the ink droplets 14A are absent may serve as a protective layer after being cured.

Next, the ink droplets 14A ejected from the inkjet recording head 14 are applied to the curable layer 12B that has been supplied onto the intermediate transfer drum 10. The inkjet recording head 14 applies the ink droplets 14A to a predetermined position in the curable layer 12B in accordance with the image information.

In this case, the ejection of the ink droplets 14A from the inkjet recording head 14 is performed on the intermediate transfer drum 10 having a rigid body. Therefore, the ejection of the ink droplets 14A is performed on the curable layer 12B in such a state that the surface of the drum is not flexed.

Next, a recording medium P is nipped between the intermediate transfer drum 10 and the transfer unit 16, and a pressure is applied to the curable layer 12B to transfer the curable layer 12B on which an image is formed by the ink droplets 14A onto the recording medium P.

Next, the image T formed by the ink droplets 14A is fixed onto the recording medium P by means of a curable resin, by curing the curable layer 12B by applying a stimulus by the stimulus application unit 18. In this way, the curable resin layer (image layer) having the image T formed from the ink droplets 14A is formed on the recording medium P.

Thereafter, residues of the curable layer 12B and adhesive matters remaining on the surface of the intermediate transfer drum 10 from which the curable layer 12B has been transferred to the recording medium P are removed by a cleaning unit 20. The image recording process is repeated by supplying the image recording composition 12A onto the intermediate transfer drum 10 from the supply unit 12 and forming the curable layer 12B.

As described above, image recording is performed in the recording apparatus 101 according to the present exemplary embodiment.

Second Exemplary Embodiment

Figure 2:
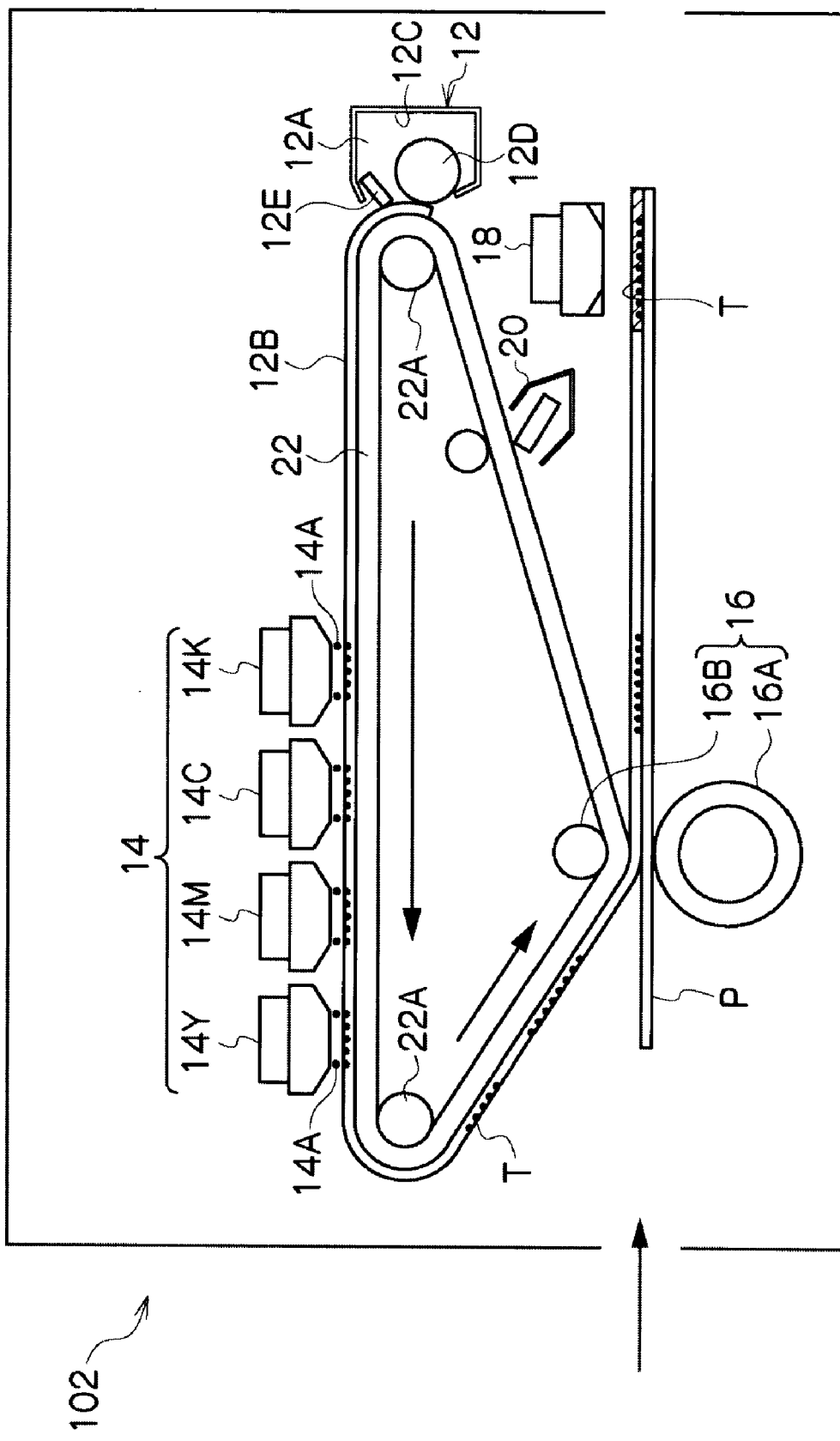
FIG. 2 is a configurational drawing showing a recording apparatus according to a second exemplary embodiment of the invention.

FIG. 2 is a configurational drawing showing a recording apparatus according to a second exemplary embodiment of the invention.

As shown in FIG. 2, the recording apparatus 102 according to the second exemplary embodiment has an intermediate transfer belt 22 in place of the intermediate transfer drum 10 in the first exemplary embodiment.

The intermediate transfer belt 22 is, for example, rotatably supported by two support rollers 22A and a pressure roller 16B (transfer unit 16) while applying a tension from the inner side of the belt.

The intermediate transfer belt 22 has a width (the length in an axial direction) equal to or wider than the width of the recording medium P. The intermediate transfer belt 22 may be formed from various kinds of resins (such as polyimide, polyamideimide, polyester, polyurethane, polyamide, polyether sulfone, and fluorine-based resins), various kinds of rubbers (such as nitrile rubber, ethylene-propylene rubber, chloroprene rubber, isoprene rubber, styrene rubber, butadiene rubber, butyl rubber, chlorosulfonated polyethylene, urethane rubber, epichlorohydrin rubber, acrylic rubber, silicone rubber and fluororubber), and the like. The intermediate transfer belt 22 may have a single-layer structure or a laminated structure. The intermediate transfer belt 22 may have a surface layer formed from a releasable material such as a fluorine-based resin or silicone rubber.

Each recording head 14 is positioned in a region in which the intermediate transfer belt 22 is not flexed, with a distance between the nozzle face of the head and the surface of the intermediate transfer belt 22 of from about 0.7 mm to about 1.5 mm, for example.

The transfer unit 16 includes, for example, a pair of pressure rollers 16A and 16B that are positioned opposite to one another via the intermediate transfer belt 22.

In the recording apparatus 102 according to the present exemplary embodiment, ink droplets 14A are ejected from the inkjet recording head 14 and applied onto the curable layer 12B that has been formed on the intermediate transfer belt 22.

The ejection of the ink droplets 14A from the inkjet recording head 14 is performed in a region in which the intermediate transfer belt 22 is not flexed. Therefore, the ink droplets 14A are ejected onto the curable layer 12B in such a state that the surface of the belt is not flexed.

Since matters other than the above are the same as those of the first exemplary embodiment, explanations thereof will be omitted.

Third Exemplary Embodiment

Figure 3:
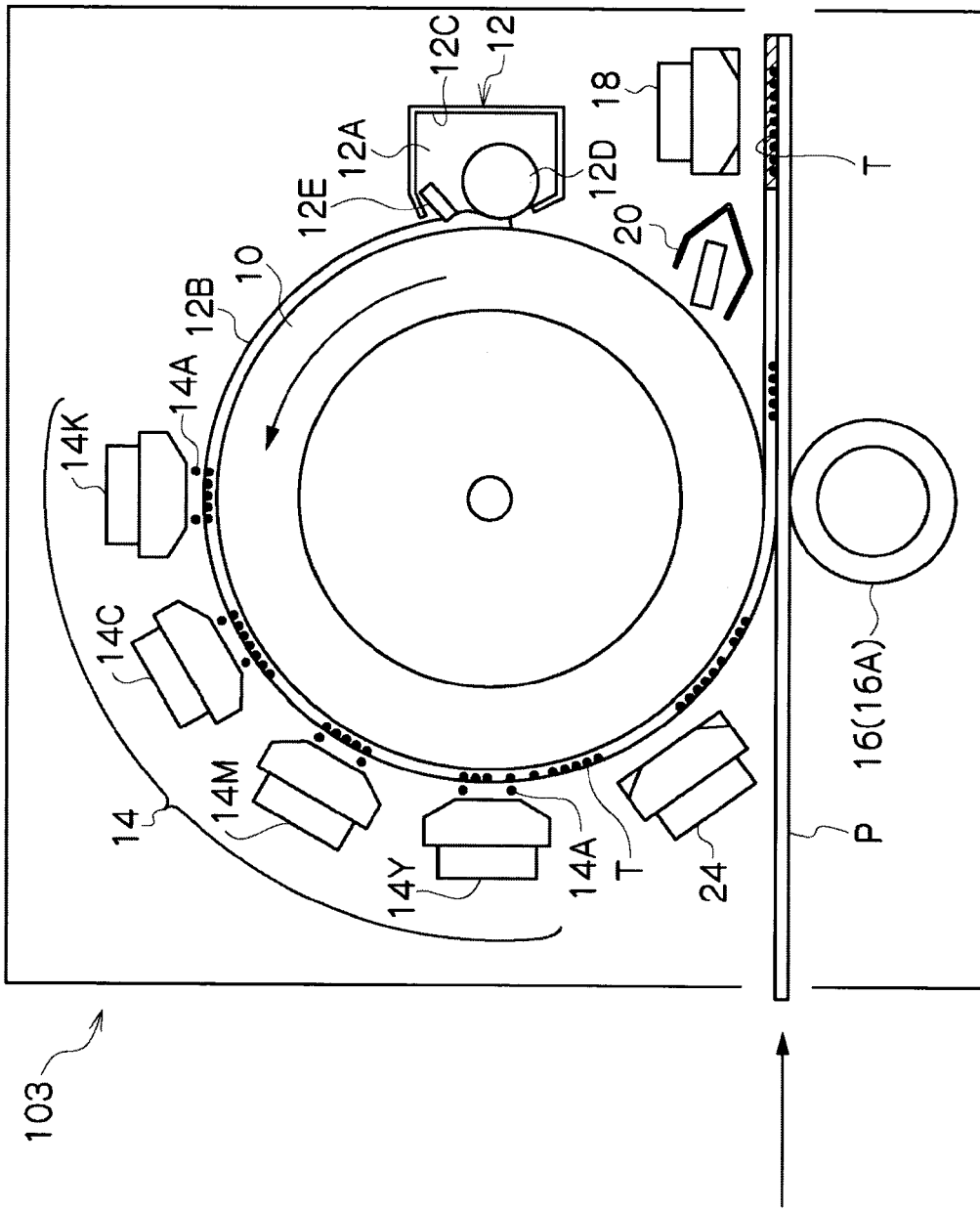
FIG. 3 is a configurational drawing showing a recording apparatus according to a third exemplary embodiment of the invention; and, FIG. 4 is a configurational drawing showing a recording apparatus according to a fourth exemplary embodiment of the invention.

FIG. 3 is a configurational drawing showing a recording apparatus according to a third exemplary embodiment of the invention.

As shown in FIG. 3, a recording apparatus 103 according to the third exemplary embodiment includes a second stimulus application unit 24, which partially cures the curable layer 12B on which an image is formed from ink droplets 14A before the curable layer 12B is transferred onto a recording medium P.

The second stimulus application unit 24 is arranged, for example, downstream of the inkjet recording head 14 and upstream of the transfer device 16, in a rotation direction of the intermediate transfer belt 22.

The second stimulus application unit 24 may be selected depending on the type of the curable material included in the image recording composition 12A, in a similar manner to the stimulus application unit 18. Specifically, when the curable material is a material that is curable by ultraviolet rays, for example, an ultraviolet-ray irradiation unit that irradiates the image recording composition 12A (or the curable layer 12B formed from the curable material 12A) with ultraviolet rays is used as the second stimulus application unit 24. When the curable material is a material that is curable by electron beams, an electron-beam irradiation unit that irradiates the image recording composition 12A (or the curable layer 12B formed from the image recording composition 12A) is used as the second stimulus apply device 24. Further, when the curable material is a material that is curable by heat, a heat application unit that applies heat to the image recording composition 12A (or the curable layer 12B formed from the image recording composition 12A) is used as the second stimulus application unit 24.

The conditions of applying ultraviolet rays, electron beams, or heat by the second stimulus application unit 24 are not specifically restricted, and may be selected depending on the type of the curable material, the thickness of the curable layer and the like, as long as the curable layer 12B on which ink droplets 14A are applied by the inkjet recording head 14 is partially cured when transferred from the intermediate transfer drum 10 to a recording medium P by the transfer unit 16.

In this exemplary embodiment, the second stimulus application unit 24 is arranged downstream of the inkjet recording head 14 and upstream of the transfer device 16, but the second stimulus application unit 24 may be arranged upstream of the inkjet recording head 14. When the second stimulus application unit 24 is arranged upstream of the inkjet recording head 14, ink droplets 14A are ejected from the inkjet recording head 14 to the curable layer 12B that has been partially cured to have an increased viscosity. Accordingly, diffusion of the ink droplets 14A in the curable layer 12B is further suppressed, and an image with a higher fineness can be formed.

Here, the state of being "partially cured" refers to a state in which the curable material is not "fully cured", but is cured to some extent, as compared with the curable material in a fully liquid state at the time of being supplied onto the intermediate transfer member. Whether or not the curable material is in a state of being "partially cured" can be determined by the following manner. Namely, when transfer of the curable layer 12B to a sheet of paper having permeability (such as plain paper) put on the curable layer 12B does not occur when no load is applied, but occurs with a load of 200 g, it can be determined that the curable layer 12B is partially cured.

In the recording apparatus 103 according to the present exemplary embodiment as described above, the curable layer 12B is partially cured by the second stimulus application unit 24 after the application of the ink droplets 14A ejected from the inkjet recording head 14 onto the curable layer 12B that has been supplied onto the intermediate transfer drum 10, and then the curable layer 12B is transferred onto the recording medium P by the transfer device 16. At the time of the transferring, the curable layer 12B is in a state of being partially cured, namely, having a certain degree of rigidity, and is transferred onto the recording medium P.

Since matters other than the above are the same as those of the first exemplary embodiment, explanations thereof will be omitted.

Fourth Exemplary Embodiment

Figure 4:
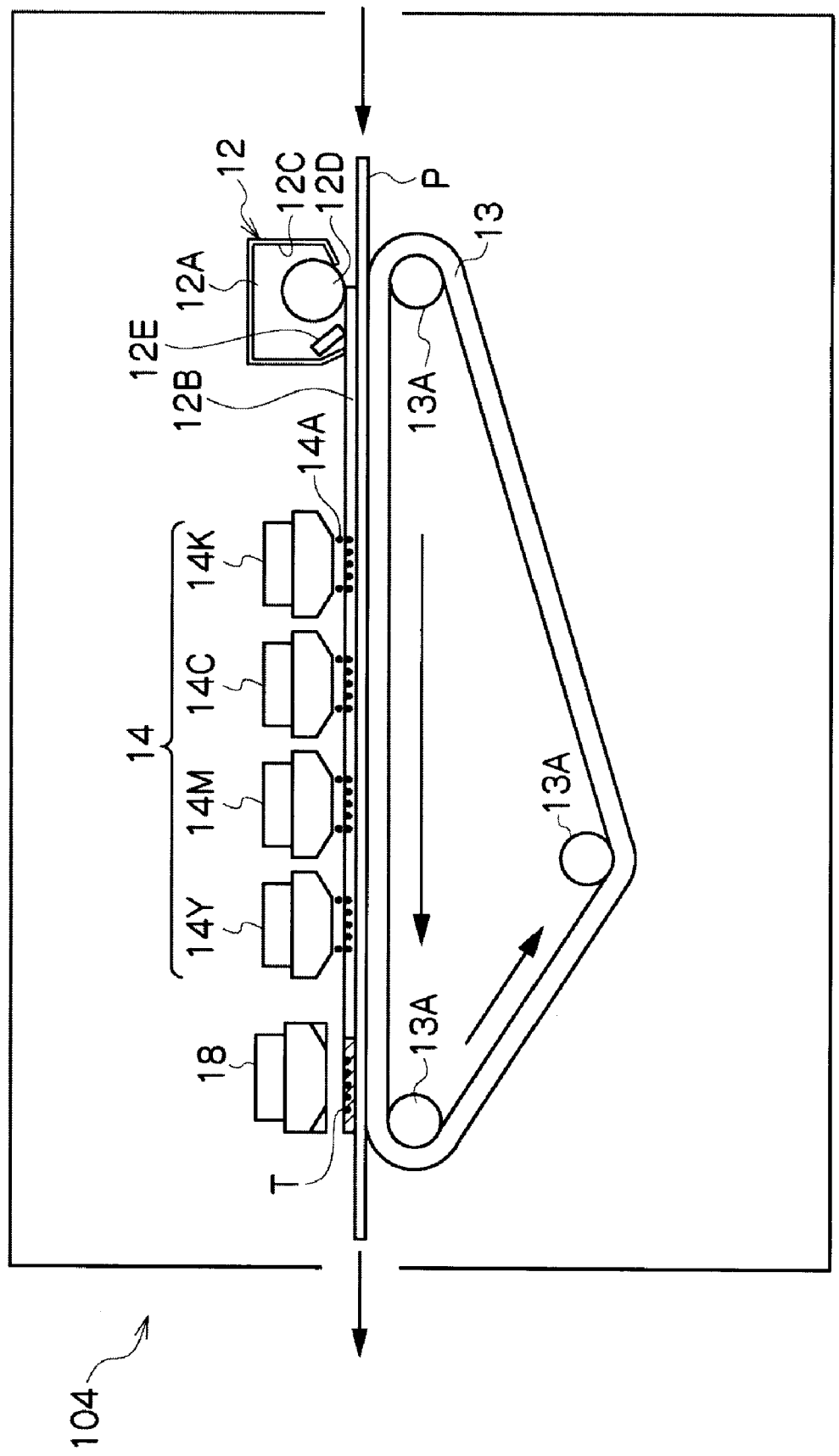

FIG. 4 is a configurational drawing showing a recording apparatus according to a fourth exemplary embodiment of the invention.

As shown in FIG. 4, the recording apparatus 104 according to the fourth exemplary embodiment has a structure in which an image is directly formed on a recording medium P (direct recording system).

The recording apparatus 104 includes, for example, a supply unit 12 that supplies an image recording composition 12A, containing a curable material that is curable upon application of an external stimulus (energy) and an oil absorbing material, onto a recording medium P to form a curable layer 12B from the image recording composition 12A; an inkjet recording head 14 that forms an image T by ejecting ink droplets 14A onto the curable layer 12B; and a stimulus application unit 18 that applies a stimulus to cure the curable layer 12B.

Further, the recording apparatus 104 includes a conveyor belt 13 that conveys the recording medium P. The conveyor belt 13 may be, for example, an endless belt similar to the intermediate transfer belt 22 in the second exemplary embodiment. For example, the conveyor belt 13 is rotatably supported by three support rollers 13A while applying a tension from the inner side of the belt. The conveyor belt 13 conveys the recording medium P supplied from a storage container (not shown) and the like, in a direction shown by an arrow by rotating.

In the recording apparatus 104, a curable layer 12B is formed from an image recording composition 12A supplied from a supply unit 12 onto the surface of a recording medium P being conveyed by the conveyor belt 13. Subsequently, ink droplets 14A are ejected from an inkjet recording head 14 in accordance with the image information, and an image T is formed by the ink droplets 14A supplied onto the curable layer 12B formed on the recording medium P. Finally, the curable layer 12B is cured by the stimulus application unit 18, and the curable resin layer (image layer) including the image T formed from the ink droplets 14A is formed on the recording medium P.

Since matters other than the above are the same as those of the first exemplary embodiment, explanations thereof will be omitted.

In the recording apparatuses according to the exemplary embodiments described above, the image recording composition 12A is applied to the intermediate transfer drum 10, the intermediate transfer belt 22, or the recording medium P, to form the curable 12B. After the ink droplets 14A are applied to the curable layer 12B to form an image T (in the first to third exemplary embodiments, after further transferring the curable layer 12B to the recording medium P), the curable layer 12B on which the image is formed is completely cured. At this time, the curable material contained in the curable layer 12B is cured to turn to a "cured resin". Accordingly, an image can be formed on various recording media P, regardless of whether the recording medium P is an impermeable medium or a permeable medium.

In particular, in the recording apparatuses of the first to third exemplary embodiments, employing an intermediate transfer system, the curable layer 12B on the intermediate transfer member (intermediate transfer drum 10 or the intermediate transfer belt 22), on which an image T is formed, is transferred onto the recording medium P. Therefore, for example, when the curable layer 12B has a thickness through which the ink droplets 14A do not reach the bottom of the curable layer 12B, the portion where the ink droplets 14A are present (the portion corresponding to image T) in the curable layer 12B that has been transferred to the recording medium P is not exposed, and the portion where the ink droplets 14 are absent of the curable layer 12B may serve as a protective layer after being cured, thereby enhancing image storability.

On the other hand, in the recording apparatus according to the fourth exemplary embodiment, since a system in which the image recording composition 12A is directly supplied onto the recording medium P (direct-recording system) is employed, the structure of the recording apparatus can be simplified, thereby enabling image formation at high speed and low cost.

Further, in each of the recording apparatuses according to the exemplary embodiments as described above, an image recording composition 12A containing the curable material that is curable upon application of an external stimulus and a cationic resin having a cationic functional group is used. When the ink droplets 14A are applied onto the curable layer 12B formed from the image recording composition 12A, a recording material contained in the ink droplets 14A (preferably a pigment including an anionic dispersant, a self-dispersion type pigment having an anionic functional group, an anionic dye, or the like; details will be descried later) interacts with the cationic functional group of the cationic resin contained in the image recording composition 12A (for example, salt-formation by the recording material and the cationic resin, ion exchange of the counter ions of the recording material to a cationic resin, or the like), thereby reducing the solubility, dispersibility, or fluidity of the recording material in the ink droplets 14A in the curable layer 12B formed from the image recording composition 12A, or suppressing the diffusion of the recording material. Consequently, the image formed from ink droplets 14A is fixed in the layer 12B formed from the image recording composition 12A before being cured. As a result, an image with high fineness and suppressed ink blurring can be formed.

Hereinafter, the image recording composition 12A will be described in detail. In addition, denotations are omitted in the description.

The image recording composition contains a curable material that is curable upon application of an external stimulus, and a cationic resin having a cationic functional group.

The curable materials include ultraviolet-ray curable materials, electron-beam curable materials, thermosetting materials, and the like. The ultraviolet-ray curable materials are easy to be cured and the speed of curing is high, as compared with other types of materials, and thus are easy to handle. The electron-beam curable materials can be cured without using a polymerization initiator, and thus make it easy to control the coloring state of the layer after curing. The thermosetting materials can be cured without using a large-scale apparatus. In the invention, the curable materials are not restricted thereto, and materials that can be cured with moisture, oxygen, or the like may also be used.

The "ultraviolet-ray curable resins" that is obtained by curing an ultraviolet-ray curable material include, for example, an acrylic resin, a methacrylic resin, a urethane resin, a polyester resin, a maleimide resin, an epoxy resin, an oxetane resin, a polyether resin, and a polyvinyl ether resin. The image recording composition 12A contains at least one kind of an ultraviolet-ray curable monomer, an ultraviolet-ray curable macromer, an ultraviolet-ray curable oligomer, and an ultraviolet-ray curable prepolymer. Further, the image recording composition 12A preferably contains an ultraviolet-ray polymerization initiator that promotes an ultraviolet-ray curing reaction. In order to promote the polymerization reaction, the image recording composition 12A may further contain a reaction aid, a polymerization promoter, or the like.

The ultraviolet-ray curable monomers include, for example, radical curable materials such as an acrylic ester of alcohol/polyhydric alcohol/amino alcohols, a methacrylic acid ester of alcohol/polyhydric alcohols, an acrylic aliphatic amide, an acrylic alicyclic amide, and an acrylic aromatic amide; cationic curable materials such as an epoxy monomer, an oxetane monomer, and a vinylether monomer. The ultraviolet-ray curable macromers, the ultraviolet-ray curable oligomers, and the ultraviolet-ray curable prepolymers include those prepared by polymerizing these monomers at a certain polymerization degree, and radical curable materials such as an epoxy acrylate, a urethane acrylate, a polyester acrylate, a polyether acrylate, a urethane methacrylate and a polyester methacrylate formed by adding an acryloyl group or a methacryloyl group to an epoxy, urethane, polyester or polyether skeleton.

When the curing reaction progresses through a radical reaction, ultraviolet-ray polymerization initiators that can be used include, for example, benzophenone, thioxanthone-type initiators, benzyl dimethyl ketal, an α-hydroxyketone, an α-hydroxy alkylphenone, an α-aminoketone, an α-amino alkylphenone, a monoacylphosphine oxide, a bisacylphosphine oxide, hydroxybenzophenone, aminobenzophenone, titanocene-type initiators, oxime ester-type initiators, oxyphenylacetate-type initiators, and the like.

Further, when the curing reaction progresses through a cationic reaction, the ultraviolet-ray polymerization initiators that can be used include, for example, an aryl sulfonium salt, an aryl diazonium salt, a diaryl iodonium salt, a triaryl sulfonium salt, an allene-ion complex derivative, a triazine type initiator, and the like.

The "electron-beam curable resins" obtained by curing the electron-beam curable material include, for example, an acrylic resin, a methacrylic resin, a urethane resin, a polyester resin, a polyether resin, a silicone resin, and the like. The curable material 12A in this case contains at least one kind of an electron-beam curable monomer, an electron-beam curable macromer, an electron-beam curable oligomer, and an electron-beam curable prepolymer.

Examples of the electron-beam curable monomer, the electron-beam curable macromer, the electron-beam curable oligomer, and the electron-beam curable prepolymer include materials similar to the aforementioned ultraviolet-ray curable materials.

The "thermosetting resins" obtained by curing the thermosetting material include an epoxy resin, a polyester resin, a phenol resin, a melamine resin, a urea resin, an alkyd resin, and the like. The image recording composition 12A in this case contains at least one kind of a thermosetting monomer, a thermosetting macromer, a thermosetting oligomer and a thermosetting prepolymer. Further, a curing agent may be added at the time of polymerization. In order to promote the thermal curing reaction, the image recording composition 12A may also contain a thermal polymerization initiator.

The thermosetting monomers include, for example, phenol, formaldehyde, bisphenol A, epichlorohydrin, cyanuric acid amide, urea, polyalcohols such as glycerin, and acids such as phthalic anhydride, maleic anhydride and adipic acid. The thermosetting macromers, thermosetting oligomers and thermosetting prepolymers include those obtained by polymerizing the aforementioned monomers to a predetermined polymerization degree, an epoxy prepolymer, a polyester prepolymer, and the like.

The thermal polymerization initiators include, for example, acids such as protic acid/Lewis acid, an alkali catalyst, a metal catalyst, and the like.

The curable material is not restricted as long as the material is cured (for example, as a result of the progress of polymerization reaction) by an external energy such as ultraviolet rays, electron beams, and heat. In view of increasing the speed of the image recording, materials with a high curing rate (for example, materials having a high polymerization reaction rate) are desirable. Examples of such curable materials include radiation curable materials (such as the above-mentioned ultraviolet-ray curable materials, electron-beam curable materials).

In view of improving the wetting property to the intermediate transfer member or the like, the curable material may be modified with silicon, fluorine, or the like. Further, in consideration of the curing rate and curing degree, the curable material preferably contains a polyfunctional prepolymer.

From the viewpoint of forming an image with high fineness, the curable material desirably has a small rate of contraction due to a curing reaction. Further, in view of suppressing the contraction due to the curing reaction, it is preferable that the softness of the curable material is not too high. The viscosity of the curable material is desirably 5 mPa·s or more.

The cationic resin is a resin having a cationic functional group, and preferable examples of the cationic functional groups include groups derived from amines (primary, secondary and tertiary), onium salts (quaternary ammonium salt, phosphonium salt), guanide, biguanide, and a heteroaromatic ring containing a nitrogen atom, and the like.

Preferable examples of the cationic resins include polyamine-based compounds (such as a polyallylamine, a polyethyleneimine, a polyetheramine, a polyvinylamine, a polydiallylamine, and a polydimethylallylamine), poly (meth)acrylic acid dimethylamino methyl ester compounds, cation-modified polyacrylamide-based compounds (such as a polyacryl dialkylamino alkylamide, and a polyacrylamide in which polyallylamine is partially copolymerized), a polyvinyl pyridine, a polyvinyl amidine, polymers modified with a quaternary ammonium salt (for example, a polydiallyl dimethyl ammonium chloride, a polydiallyl methylethyl ammonium sulfate, a polyacryl alkyl ammonium alkyl ester, and a polymethacryl alkyl ammonium alkyl ester), and guanidine polymers (such as guanidine-formaldehyde condensates).

These compounds may be (partially) neutralized salt compounds obtained by treating these compounds with an acid.

Further, the cationic resin may be a homopolymer of a monomer having a cationic functional group, or may be a copolymer of a monomer having a cationic functional group and other monomer(s) (such as a monomer having an anionic functional group and a nonionic monomer).

Preferable examples of the monomers having a cationic functional group include an allylamine, an ethyleneimine, a vinyl amine, a diallylamine, a dimethyl allylamine, an aminoalkyl acrylate, an aminoalkyl methacrylate, an acrylamino alkylamide, a methacrylamino alkylamide, a vinyl pyridine, a vinyl amidine, a diallyl dimethyl ammonium chloride, a diallyl methylethyl ammonium sulfate, an alkyl ammonium (meth)acrylate, guanidine, and hexamethylene biguanide.

Preferable examples of the monomers having an anionic functional group include acrylic acid, methacrylic acid, a carboxyalkyl(meth)acrylate, a sulfoxyalkyl(meth)acrylate, styrene sulfonic acid, 4-vinyl benzoic acid, naphthalene sulfonic acid, and mono-2-methacryloyloxyethyl phthalate.

Preferable examples of the nonionic monomers include a (meth)acrylate, a (meth)acrylamide, an oxyalkylene(meth) acrylate, styrene, acrylonitrile, and the like.

The ratio of the monomer having a cationic functional group to other monomer(s) (molar ratio: monomer having a cationic functional group/other monomer(s)) is, for example, from 20/80 to 100/0 (desirably from 40/60 to 100/0).

The cationic resin may be either a non-crosslinked resin or a crosslinked resin, but preferably a crosslinked resin, from the viewpoint of the storage stability thereof in the image recording composition and the ability of forming an image with high fineness. The polymers may be crosslinked by adding a polyfunctional monomer in an amount of 0.1% by weight to 5% by weight at the time of synthesizing the resin, using a catalyst to cause reaction between the polymers, using a metal or the like to cause ion bonding between the polymers, or the like.

The cationic resin may be a liquid absorptive resin. When the cationic resin is a liquid absorptive resin, a liquid component (mainly a solvent or a dispersion medium (vehicle liquid)) in an ink to be applied is absorbed and the diffusion of the ink is suppressed, thereby suppressing blurring of the ink. Moreover, the speed of recording an image can also be increased. When the liquid to be absorbed is water-based, the resin having a liquid absorptivity can be obtained by copolymerizing the cationic resin with a monomer having a hydrophilic functional group such as (meth)acrylic acid, or by modifying a part of the cationic resin with a highly hydrophilic functional group.

The liquid absorptive resin refers to, when the liquid to be absorbed is water-based, a resin which can absorb water in an amount of 80% by weight or more with respect to the weight of the resin. The liquid absorptivity can be calculated from the difference between the weight of the resin before the absorption and the weight of the resin after the absorption.

The cationic resin may be dissolved in the image recording composition, but is preferably dispersed in the image recording composition in the form of insoluble particles, in a similar manner to the aforementioned crosslinked resin, from the viewpoint of the storage stability thereof in the image recording composition and the ability of forming an image with high fineness. When the cationic resin is in the form of particles, the volume average particle diameter is preferably in the range of from 0.05 µm to 20 µm, more preferably from 0.1 µm to 15 µm, and further preferably from 0.2 µm to 10 µm, from the viewpoint of forming an image with high fineness.

Further, the weight average molecular weight of the cationic resin is, for example, 5,000 or more (preferably 20,000 or more).

Moreover, the content (concentration of solid content in the material) of the cationic resin is preferably from 5% by weight (or about 5% by weight) to 50% by weight (or about 50% by weight), and more preferably from 10% by weight to 45% by weight with respect to the total amount of the image recording composition. When the content of the cationic resin is lower than the above range, fixation of the recording material (coloring material) in the ink may be too low, and when the content of the cationic resin exceeds the above range, storage storability and coating properties of the image forming composition may be deteriorated.

Other components that may be included in the image recording composition include a component that adsorbs a component (for example, coloring material) in ink, but are not limited thereto.

The components that adsorb a component (for example, coloring material) in ink include silica, alumina, zeolite, and the like. The ratio of the component is approximately in the range of from 0% by weight to 30% by weight.

Further, the image recording composition may contain water or an organic solvent that dissolves or disperses a main component that contributes to the curing reaction (such as a monomer, macromer, oligomer, prepolymer, or polymerization initiator). However, the content of the main component is, for example, in the range of 30% by weight or more, preferably 60% by weight or more, and more preferably 90% by weight or more.

Further, the image recording composition may contain a coloring material of various kinds for the purpose of controlling the color of the cured layer.

Next, the characteristics of the image recording composition will be explained.

Considering easiness in coating of the image recording composition and easiness in fixation of ink droplets 14A, the viscosity of the image recording composition is preferably from 30 mPa·s to 100,000 mPa·s, more preferably from 50 mPa·s to 50,000 mpa·s, and still more preferably from 100 mPa·s to 10,000 mpa·s. Moreover, the viscosity of the image recording composition is preferably higher than the viscosity of the ink.

Further, the image recording composition is preferably low-volatile or non-volatile at ordinary temperature (for example, at 25° C.). Here, being low-volatile refers to that the boiling point is 200° C. or more at atmospheric pressure. Further, being non-volatile refers to that the boiling point is 300° C. or more at atmospheric pressure. The same will apply to the following description.

The ink used in the invention may be either an aqueous ink or an oily ink, but an aqueous ink is preferable from the viewpoint of environmental properties. The aqueous ink (hereinafter, simply refers to ink) contains a solvent (such as water or a water-soluble organic solvent) and a recording material. The ink may include other additive(s), as necessary.

As the recording material, a coloring material is typically used. Although both dyes and pigments are usable, pigments are preferred. Both organic pigments and inorganic pigments can be used as the pigment, and black pigments include carbon black pigments such as furnace black, lamp black, acetylene black, channel black, and the like. Other than pigments of black and three primary colors of cyan, magenta and yellow, pigments of a specific color such as red, green, blue, brown and white, pigments having a metallic luster such as gold and silver, extender pigments having no color or a pale color, may be used. Pigments that are newly synthesized for the present exemplary embodiment may also be used.

Further, particles formed by adhering a dye or a pigment to the surface of a core formed from silica, alumina, or polymer beads, insoluble laked products of a dye, a colored emulsion, a colored latex or the like may also be used as the pigment.

Specific examples of black pigments include RAVEN 7000, RAVEN 5750, RAVEN 5250, RAVEN 5000 ULTRAII, RAVEN 3500, RAVEN 2000, RAVEN 1500, RAVEN 1250, RAVEN 1200, RAVEN 1190 ULTRAII, RAVEN 1170, RAVEN 1255, RAVEN 1080 and RAVEN 1060 (trade names; manufactured by Columbian Carbon); REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300 and MONARCH 1400 (trade names; manufactured by Cabot Corporation); COLOR BLACK FW1, COLOR BLACK FW2, COLOR BLACK FW2V, CLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A and SPECIAL BLACK 4 (trade names; manufactured by Degussa); and No. 25, No. 33, No. 40, No. 47, No. 52, No. 900, No. 2300, MCF-88, MA 600, MA 7, MA 8 and MA 100 (trade names; manufactured by Mitsubishi Chemical Corporation), but are not limited thereto.

Specific examples of cyan color pigments include C. I. PIGMENT BLUE-1, -2, -3, -15, -15:1, -15:2, -15:3, -15:4, -16, -22 and -60, but are not limited thereto.

Specific examples of magenta color pigments include C. I. PIGMENT RED-5, -7, -12, -48, -48:1, -57, -112, -122, -123, -146, -168, -177, -184, -202 and C. I. PIGMENT PIGMENT VIOLET-19, but are not limited thereto.

Specific examples of yellow color pigments include C. I. PIGMENT YELLOW-1, -2, -3, -12, -13, -14, -16, -17, -73, -74, -75, -83, -93, -128, -129, -138, -151, -154 and -180, but are not limited thereto.

When a pigment is used as the coloring material, it is desirable to use a dispersing agent in combination. The dispersing agents that can be used in the invention include a polymeric dispersant, an anionic surfactant, a cationic surfactant, an amphoteric surfactant, and a nonionic surfactant.

As the polymeric dispersant, polymers having both a hydrophilic structural moiety and a hydrophobic structural moiety are suitably used. The polymer having both a hydrophilic structural moiety and a hydrophobic structural moiety may be either a condensation-type polymer or an addition-type polymer. The condensation-type polymers include known polyester-type dispersants. The addition-type polymers include an addition polymer of a monomer having an $\alpha,\beta$-ethylenic unsaturated group. The desired polymeric dispersant may be obtained by copolymerizing a monomer having an $\alpha,\beta$-ethylenic unsaturated group and a hydrophilic group with a monomer having an $\alpha,\beta$-ethylenic unsaturated group and a hydrophobic group. Moreover, a homopolymer of a monomer having a hydrophilic group and an $\alpha,\beta$-ethylenic unsaturated group may also be used.

Monomers having an $\alpha,\beta$-ethylenic unsaturated group and a hydrophilic group include monomers having a carboxyl group, a sulfonic acid group, a hydroxyl group, a phosphoric group, or the like. Specific examples thereof include acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylamide, methacryloxy ethyl phosphate, bismethacryloxy ethyl phosphate, methacryloxy ethyl phenyl acid phosphate, ethylene glycol dimethacrylate, and diethylene glycol dimethacrylate.

Monomers having an $\alpha,\beta$-ethylenic unsaturated group and a hydrophobic group include styrene, styrene derivatives such as $\alpha$-methyl styrene and vinyltoluene, vinyl cyclohexane, vinyl naphthalene, vinyl naphthalene derivatives, an alkyl acrylate, an alkyl methacrylate, phenyl methacrylate, an cycloalkyl methacrylate, an alkyl crotonate, an dialkyl itaconate, and an dialkyl maleate.

Preferable examples of copolymers used as a polymeric dispersant include a styrene-styrene sulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, an alkylacrylate-acrylic acid copolymer, an alkylmethacrylate-methacrylic acid copolymer, a styrene-alkylmethacrylate-methacrylic acid copolymer, a styrene-alkylacrylate-acrylic acid copolymer, a styrene-phenyl methacrylate-methacrylic acid copolymer, and a styrene-cyclohexylmethacrylate-methacrylic acid copolymer. Moreover, monomers having a polyoxyethylene group or a hydroxyl group may be copolymerized with these polymers.

The above polymeric dispersants may have a weight average molecular weight of from 2,000 to 50,000, for example.

These pigment dispersants may be used singly or in combination of two or more kinds. The addition amount of the dispersants may greatly vary depending on the kind of the pigment, but is commonly from 0.1% by weight to 100% by weight with respect to the amount of the pigment.

A self-dispersible pigment that can dissolve in water by itself may also be used as a coloring material. The self-dispersible pigment that can dissolve in water by itself refers to a pigment having many groups that are soluble to water on the surface of the pigment, which can disperse in water without the presence of a polymeric dispersant. Specifically, the self-dispersible pigment can be obtained by subjecting a common pigment to a surface modifying treatment such as an acid/base treatment, a coupling agent treatment, a polymer graft treatment, a plasma treatment, or an oxidation/reduction treatment.

Further, the self-dispersible pigments in water include, other than the pigments that has been subjected to a surface modifying treatment as described above, CAB-O-JET-200, CAB-O-JET-300, IJX-157, IJX-253, IJX-266, IJX-273, IJX-444, IJX-55, and CABOT 260 (trade names; manufactured by Cabot Corporation), and MICROJET BLACK CW-1 and CW-2 (trade names; manufactured by Orient Chemical Industries, Ltd.).

The self-dispersible pigment preferably has at least a sulfonic acid, a sulfonic acid salt, a carboxylic acid or a carboxylic acid salt on the surface of the pigment, as a functional group. The self-dispersible pigment is more preferably a pigment having at least a carboxylic acid or a carboxylic acid salt on the surface of the pigment as a functional group.

Further, pigments covered with a resin may also be used. Such pigments are called a microcapsule pigment and include commercially available microcapsule pigments manufactured by DIC Corporation, Toyo Ink Manufacturing Co., Ltd., or the like, and microcapsule pigments experimentally prepared for the present exemplary embodiment may also be used.

Moreover, resin dispersion-type pigments prepared by physically adsorbing or chemically bonding the aforementioned polymer material to the above pigments may also be used.

The recording materials include dyes such as hydrophilic anionic dyes, direct dyes, cationic dyes, reactive dyes and polymeric dyes, and oil-soluble dyes; wax powder, resin powder or emulsions colored with a dye; fluorescent dyes and fluorescent pigments, infrared absorbing agents, and ultraviolet absorbing agents; magnetic substances, represented by ferromagnetic substances such as ferrite and magnetite; semiconductors or photocatalysts represented by titanium oxide and zinc oxide; and other organic and inorganic electronic material particles.

Among these recording materials, from the viewpoint of effectively preventing diffusion of ink and suppressing ink blurring with the cationic resin contained in the image recording composition, pigments using an anionic dispersant (for example, the aforementioned anionic surfactant), self-dispersion type pigments having an anionic functional group (for example, sulfonic acid, sulfonic acid salt, carboxylic acid, or carboxylic acid salt, as set forth above), and anionic dyes are most preferable as the recording material.

The content (concentration) of the recording material is, for example, in the range of from 5% by weight to 30% by weight with respect to the amount of the ink.

The volume average particle diameter of the recording material is, for example, in the range of from 10 nm to 1,000 nm.

The volume average particle diameter of the recording material refers to the particle diameter of the recording material particles themselves, or when an additive such as a dispersant is adhered to the recording material particles, refers to the particle diameter of the recording material particles including the additive attached thereto. As a measuring device of the volume average particle diameter, Microtrac UPA particle size distribution analyzer 9340 (trade name; manufactured by Leeds & Northrup) may be used. The measurement is conducted by putting 4 ml of the ink in a measurement cell, and performing measurement in accordance with a predetermined measuring method. As the data to be input upon measurement, the viscosity of the ink is used as the viscosity, and the density of the recording material is used as the density of dispersed particles.

The water-soluble organic solvents include polyhydric alcohols, polyhydric alcohol derivatives, nitrogen-containing solvents, alcohols, sulfur-containing solvents, and the like.

Specific examples of the water-soluble organic solvent include polyhydric alcohols such as ethylene glycol, diethylene glycol, propylene glycol, butylene glycol, triethylene glycol, 1,5-pentanediol, 1,2-hexanediol, 1,2,6-hexanetriol, glycerin and trimethylol propane; sugar alcohols such as xylitol; and saccharides such as xylose, glucose, and galactose.

The polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adducts of diglycerol.

The nitrogen-containing solvents include pyrrolidone, N-methyl-2-pyrrolidone, cyclohexyl pyrrolidone and triethanol amine.

The alcohols include alcohols such as ethanol, isopropyl alcohol, butyl alcohol and benzyl alcohol.

The sulfur-containing solvents include thiodiethanol, thiodiglycerol, sulfolane and dimethyl sulfoxide.

The water-soluble organic solvent may also be propylene carbonate and ethylene carbonate.

The water-soluble organic solvent may be used singly or in combination of two or more kinds. The content of the water-soluble organic solvent is, for example, in the range of from 1% by weight to 70% by weight.

The water is desirably ion exchange water, ultrapure water, distilled water, ultrafiltrated water or the like, in order to prevent the water from being contaminated with impurities.

The other additives that may be used in the ink include a surfactant.

The surfactants include various kinds of anionic surfactants, nonionic surfactants, cationic surfactants and amphoteric surfactants. Among these, anionic surfactants and nonionic surfactants are preferably used.

Examples of the anionic surfactants include an alkyl benzene sulfonic acid salt, an alkyl phenyl sulfonic acid salt, an alkyl naphthalene sulfonic acid salt, a higher fatty acid salt, a sulfuric ester salt of a higher fatty acid ester, a sulfonic acid salt of a higher fatty acid ester, a sulfuric ester salt of a higher alcohol ether, a sulfonic acid salt of a higher alcohol ether, a higher alkyl sulfosuccinic acid salt, a polyoxyethylene alkyl ether carboxylate, a polyoxyethylene alkyl ether sulfate, an alkyl phosphate, and a polyoxyethylene alkyl ether phosphate. Among these, dodecyl benzene sulfonate, isopropylnaphthalene sulfonate, monobutylphenyl phenol mono-sulfonate, monobutyl biphenyl sulfonate, and dibutylphenyl phenol disulfonate.

Examples of the nonionic surfactants include a polyoxyethylene alkyl ether, a polyoxyethylene alkyl phenyl ether, a polyoxyethylene fatty acid ester, a sorbitan fatty acid ester, a polyoxyethylene sorbitan fatty acid ester, a polyoxyethylene sorbitol fatty acid ester, a glycerin fatty acid ester, a polyoxyethylene glycerin fatty acid ester, a polyglycerin fatty acid ester, a sucrose fatty acid ester, a polyoxyethylene alkylamine, a polyoxyethylene fatty acid amide, an alkyl alkanol amide, a polyethylene glycol polypropylene glycol block copolymer, acetylene glycol, and a polyoxyethylene adduct of acetylene glycol. Among these, a polyoxyethylene nonylphenyl ether, a polyoxyethylene octylphenyl ether, a polyoxyethylene dodecylphenyl ether, a polyoxyethylene alkyl ether, a polyoxyethylene fatty acid ester, a sorbitan fatty acid ester, a polyoxyethylene sorbitan fatty acid ester, a fatty acid alkylol amide, a polyethylene glycol polypropylene glycol block copolymer, acetylene glycol, and a polyoxyethylene adduct of acetylene glycol are preferable.

In addition, silicone-based surfactants such as a polysiloxane oxyethylene adduct, fluorine-based surfactants such as a perfluoroalkyl carboxylate, a perfluoroalkyl sulfonate, and an oxyethylene perfluoroalkyl ether, and biosurfactants such as spiculisporic acid, rhamnolipid, lysolecithin, may also be used.

The surfactant may be used singly or in combination of two or more kinds. Further, in consideration of the solubility, for example, the hydrophilicity-lipophilicity balance (HLB) of the surfactant is in the range of from 3 to 20.

The addition amount of these surfactants may be, for example, in the range of from 0.001% by weight to 5% by weight, and preferably in the range of from 0.01% by weight to 3% by weight.

In addition, the ink may include a penetrant for the purpose of adjusting the permeability of the ink; polyethyleneimine, polyamines, polyvinyl pyrrolidone, polyethylene glycol, ethylcellulose, carboxymethyl cellulose, and the like, for the purpose of controlling characteristics of the ink such as ink-ejection properties; and alkali metal compounds such as potassium hydroxide, sodium hydroxide and lithium hydroxide for the purpose of adjusting the electroconductivity and the pH value of the ink. Further, a pH buffer, an antioxidant, an antifungal agent, a viscosity-controlling agent, an electric conductor, an ultraviolet absorber, a chelating agent, may also be added to the ink, if necessary.

In the following, characteristics of the ink will be explained.

The surface tension of the ink may be, for example, in the range of from 20 mN/m to 45 mN/m.

Here, the value of the surface tension refers to that obtained by using a Wilhelmy surface tensiometer (manufactured by Kyowa Interface Science Co., Ltd.) under the conditions of 23° C. and 55% RH.

The viscosity of the ink may be, for example, in the range of from 1.5 mPa·s to 30 mPa·s.

Here, the value of the viscosity refers to that obtained by using a viscometer, RHEOMAT 115 (trade name; manufactured by Contraves AG), under the conditions of a measurement temperature of 23° C. and a shear rate of $1400\ s^{-1}$.

The ink in the invention is not limited to the above composition. Further, for example, the ink may contain a functional material such as a liquid crystal material and an electronic material, other than the recording material.

Moreover, in each case of the above exemplary embodiments of the invention, a full color image is recorded on a recording medium by selectively ejecting ink droplets of black, yellow, magenta and cyan from respective inkjet recording heads, based on the image data. However, the exemplary embodiments of the invention are not limited to the recording of characters or images onto a recording medium, and are generally applicable to any kind of liquid-ejecting (liquid-jetting) devices for industrial use.

EXAMPLES

Hereinafter, the present invention will be explained in further details with reference to examples. However, the invention is not restricted to these examples.

Example 1

With the use of a recording apparatus having a similar configuration to the above-described second exemplary embodiment (see FIG. 2), a curable layer is formed by supplying an image recording composition onto an intermediate transfer belt from a supply unit, and ink of each color is ejected onto the curable layer from respective recording heads. Subsequently, printing is performed after transferring the curable layer onto a recording medium and curing the transferred curable layer by supplying a stimulus from a stimulus supply unit. The conditions for the above process are as follows.

The printing is performed by ejecting inks of four colors onto the "curable layer", which has been formed on a fluorine-coated resin belt to a thickness 10 μm using a roll coater, with piezo heads (resolution of 600 dpi) for respective colors. Thereafter, the "curable layer" is transferred onto a sheet of art paper (OK Kinfuji (trade name), manufactured by Oji Paper Co., Ltd.) by tightly contacting the sheet of paper to the resin belt having the "curable layer" thereon, and then curing the "curable layer" by UV irradiation using a metal halide lamp at an output of 1.5 kW, at the same time of the transferring.

Intermediate transfer belt: 0.1 mm in thickness; 350 mm in width; formed by coating an endless belt made of polyimide having an outer diameter of 168 mm with a fluorine-based resin (process speed: 400 mm/s)

Supply unit: a gravure roll coater (the thickness of the curable layer: 10 μm)

Recording head: piezo-type recording head (resolution: 600 dpi (dpi: the number of dots per inch, hereinafter the same will apply)

Transfer unit (a pressure roll): formed by covering a steel pipe with a diameter of 30 mm with a fluorine-based resin (pressing force to the intermediate transfer belt: 3 kgf/cm in linear pressure)

Stimulus application unit: a metal halide lamp (maximum output: 1.5 kW)

Recording medium: sheets of art paper (OK Kinfuji (trade name), manufactured by Oji Paper Co., Ltd.)

The image recording composition and the inks of respective colors are prepared in accordance with the following processes.

| Image recording composition | |
|---|---|
| Polyurethane acrylate (curable material); | 45 parts by weight |
| Acryloyl morpholine (curable material); | 35 parts by weight |
| 2-hydroxy-2-methyl-propiophenone (photopolymerization initiator) | 1 part by weight |
| Styrene-methacrylic acid dimethylamino methyl ester partially neutralized salt copolymer (copolymerization ratio 1:1, crosslinked, non-water-absorbing) | 20 parts by weight |

The above components are mixed and dispersed by a ball mill to obtain an image recording composition having a viscosity of 1,200 mPa·s.

| Black Ink | |
|---|---|
| Carbon black | 5 parts by weight |
| Anionic dispersant (JONCRYL 680 (trade name), manufacture by BASF) | 1 part by weight |
| Diethylene glycol | 20 parts by weight |
| 1,2-butanediol | 3.5 parts by weight |
| SURFINOL 465 (trade name, available from Nissin Chemical Industry Co., Ltd.) | 1.5 parts by weight |
| Pure water | 60 parts by weight |

The above components are mixed and NaOH is added thereto to control the pH value thereof, then the mixture is filtered with a 2-μm filter to obtain a black ink.

| Cyan Ink | |
|---|---|
| Copper phthalocyanine pigment | 4 parts by weight |
| Anionic dispersant (JONCRYL 67 (trade name), manufacture by BASF) | 0.5 parts by weight |
| Triethylene glycol | 14 parts by weight |
| Glycerin | 15 parts by weight |
| Tetramethyl decynediol oxyethylene adduct | 2.0 parts by weight |
| 1,3-butanediol | 3 parts by weight |
| Pure water | 60 parts by weight |

The above components are mixed and NaOH is added thereto to control the pH value thereof, then the mixture is filtered with a 2-μm filter to obtain a cyan ink.

| Magenta Ink | |
|---|---|
| Quinacridone-based magenta pigment | 5 parts by weight |
| Anionic dispersant (DISPERBYK-190 (trade name), manufactured by BYK-Chemie GmbH) | 0.5 parts by weight |
| Propylene glycol | 10 parts by weight |
| Diethylene glycol | 15 parts by weight |
| 2,2-butoxy ethoxyethanol | 4.5 parts by weight |
| Pure water | 65 parts by weight |

The above components are mixed and NaOH is added thereto to control the pH value thereof, then the mixture is filtered with a 2-μm filter to obtain a magenta ink.

| Yellow Ink | |
|---|---|
| Azo-based yellow pigment | 5 parts by weight |
| Anionic dispersant (SOLSPERSE 20000 (trade name), manufactured by Lubrizol Corporation) | 0.5 parts by weight |
| Tetraethylene glycol | 12 parts by weight |
| Triethyleneglycol monobutyl ether | 8.5 parts by weight |
| 1,2-hexanediol | 4 parts by weight |
| Oxyethylene laurylether | 0.5 parts by weight |
| Pure water | 70 parts by weight |

The above components are mixed and NaOH is added thereto to control the pH value thereof, then the mixture is filtered with a 2-μm filter to obtain a yellow ink.

Comparative Example 1

An image recording composition is prepared in a similar manner to Example 1, except that the styrene-methacrylic acid dimethylamino methyl ester partially neutralized salt copolymer is not used. Printing is performed in a similar manner to Example 1 using the thus prepared image recording composition.

Example 2

An image recording composition is prepared in a similar manner to Example 1, except that a cationic-modified polyacrylamide (substituted by a dimethylamino ethyl group, crosslinked, non-water-absorbing) is used in place of the styrene-methacrylic acid dimethylamino methyl ester partially neutralized salt copolymer. Printing is performed in a similar manner to Example 1, except that the thus prepared image recording composition is used.

Example 3

An image recording composition and inks of respective colors are prepared in the following manner. Printing is performed in a similar manner to Example 1, except that the image recording composition and the inks thus prepared are used. In Example 3, the thickness of the "curable layer formed from the image recording composition" formed on the resin belt is 12 μm.

| Image recording composition | |
|---|---|
| Polyoxyethylene diacrylate | 40 parts by weight |
| Polyurethane acrylate | 40 parts by weight |
| IRGACURE 184 (trade name, manufactured by Ciba Specialty Chemicals, Inc.) | 2.0 parts by weight |
| Polyacrylic acid dimethylamino methyl ester partially neutralized salt-polyacrylamide copolymer (copolymerization ratio 3:1, crosslinked, non-water-absorbing) | 20 parts by weight |

The above components are mixed and dispersed by use of a ball mill and an "image recording composition" having a viscosity of 3,500 mPa·s is obtained.

| Black Ink | |
|---|---|
| Self-dispersible carbon black having a carboxylic acid group (CABOJET 300 (trade name), manufactured by Cabot corporation) | 5 parts by weight |
| Glycerol | 15 parts by weight |
| Polyethylene glycol 400 | 20 parts by weight |
| 2,2-butoxyethoxy ethanol | 3.5 parts by weight |
| Oxyethylene-oxypropylene block polymer | 1.5 parts by weight |
| Pure water | 55 parts by weight |

The above components are mixed and NaOH is added thereto to control the pH value thereof, then the mixture is filtered with a 2-μm filter to obtain a black ink.

| Cyan Ink | |
|---|---|
| Self-dispersible copper phthalocyanine pigment having a sulfonic acid group (CABOJET 250C (trade name), manufactured by Cabot Corporation) | 4 parts by weight |
| Diethylene glycol | 15 parts by weight |
| N-methyl-2-pyrrolidone | 5 parts by weight |
| Triethylene glycol monobutyl ether | 7 parts by weight |
| SURFINOL 465 (trade name, available from Nissin Chemical Industry Co., Ltd.) | 2.0 parts by weight |
| Pure water | 60 parts by weight |

The above components are mixed and NaOH is added thereto to control the pH value thereof, then the mixture is filtered with a 2-μm filter to obtain a cyan ink.

| Magenta Ink | |
|---|---|
| Self-dispersible quinacridone-based magenta pigment having a sulfonic acid group (CABOJET 260M (trade name), manufactured by Cabot Corporation) | 5 parts by weight |
| Ethylene glycol | 5 parts by weight |
| Glycerol | 5 parts by weight |
| Tetraethylene glycol | 10 parts by weight |
| SURFINOL 440 (trade name, available from Nissin Chemical Industry Co., Ltd.) | 0.7 parts by weight |
| SURFINOL 485 (trade name; available from Nissin Chemical Industry Co., Ltd.) | 0.8 parts by weight |
| Pure water | 74 parts by weight |

The above components are mixed and NaOH is added thereto to control the pH value thereof, then the mixture is filtered with a 2-μm filter to obtain a magenta ink.

| Yellow Ink | |
| --- | --- |
| Self-dispersible azo-based yellow pigment having a sulfonic acid group (CABOJET 270Y (trade name), manufactured by Cabot Corporation) | 5 parts by weight |
| Diethylene glycol | 15 parts by weight |
| Propylene glycol | 6.5 parts by weight |
| 1,2-hexanediol | 4 parts by weight |
| Oxyethylene stearyl ether | 1.5 parts by weight |
| Pure water | 68 parts by weight |

The above components are mixed and NaOH is added thereto to control the pH value thereof, then the mixture is filtered with a 2-μm filter to obtain a yellow ink.

Example 4

An image recording composition is prepared in accordance with the following process. Printing is performed in a similar manner to Example 3, except that the thus prepared image recording composition is used.

| Image recording composition | |
| --- | --- |
| Hydroxyethyl acrylamide | 30 parts by weight |
| Polyurethane acrylate | 40 parts by weight |
| IRGACURE 754 (trade name, manufactured by Ciba Specialty Chemicals, Inc.) | 2.0 parts by weight |
| Polyallylamine partially neutralized salt (average molecular weight 50,000; neutralized with $CH_3COOH$, not-crosslinked, non-water-absorbing) | 25 parts by weight |

The above components are mixed and dispersed by use of a ball mill, and an "image recording composition" having a viscosity of 2,500 mPa·s is obtained.

Example 5

An image recording composition is prepared in accordance with the following process. Printing is performed in a similar manner to Example 1, except that the thus prepared image recording composition is used.

| Image recording composition | |
| --- | --- |
| Polyurethane acrylate | 50 parts by weight |
| Acryloyl morpholine | 44 parts by weight |
| 2-hydroxy-2-methyl-propiophenone | 2 parts by weight |
| Polymethacrylic acid dimethylamino methyl ester partially neutralized salt (neutralized with HCl, crosslinked, non-water-absorbing) | 4 parts by weight |

The above components are mixed and dispersed by use of a ball mill, and an "image recording composition" having a viscosity of 850 mPa·s is obtained.

Example 6

An image recording composition is prepared in accordance with the following process. Printing is performed in a similar manner to Example 1, except that the thus prepared image recording composition is used.

| Image recording composition | |
| --- | --- |
| Polyurethane acrylate | 25 parts by weight |
| Acryloyl morpholine | 15 parts by weight |
| 2-hydroxy-2-methyl-propiophenone | 0.2 parts by weight |
| Polymethacrylic acid dimethylamino methyl ester partially neutralized salt (average molecular weight: 500,000, neutralized with $CH_3COOH$, non-crosslinked, non-water-absorbing) | 60 parts by weight |

The above components are mixed and dispersed by use of a ball mill, and an "image recording composition" having a viscosity of 15,000 mPa·s is obtained.

Example 7

An image recording composition is prepared in accordance with the following process. Printing is performed in a similar manner to Example 1, except that the thus prepared image recording composition is used.

| Image recording composition | |
| --- | --- |
| Polyurethane acrylate | 30 parts by weight |
| 2-hydroxy-2-methyl-propiophenone | 0.1 parts by weight |
| Polymethacrylic acid dimethylamino methyl ester partially neutralized salt (neutralized with $CH_3COOH$, crosslinked, non-water-absorbing) | 35 parts by weight |
| Silicone oil | 35 parts by weight |

The above components are mixed and dispersed by use of a ball mill, and an "image recording composition" having a viscosity of 300 mPa·s is obtained.

Example 8

An image recording composition is prepared in accordance with the following process. Printing is performed in a similar manner to Example 1, except that the thus prepared image recording composition is used.

| Image recording composition | |
| --- | --- |
| Polyurethane acrylate | 20 parts by weight |
| Polyethylene glycol 300 diacrylate | 60 parts by weight |
| IRGACURE 754 (trade name, manufactured by Ciba Specialty Chemicals, Inc.) | 0.7 parts by weight |
| Polyacrylic acid-polyacrylic acid dimethylamino ethyl ester partially neutralized salt (neutralized with NaOH and $CH_3COOH$, crosslinked, water-absorptive) | 20 parts by weight |

The above components are mixed and dispersed by use of a ball mill, and an "image recording composition" having a viscosity of 400 mPa·s is obtained.

Example 9

An image recording composition is prepared in accordance with the following process. Printing is performed in a similar manner to Example 1, except that the thus prepared image recording composition is used.

| Image recording composition | |
|---|---|
| Polyurethane acrylate | 35 parts by weight |
| n-hydroxyethyl acrylamide | 50 parts by weight |
| IRGACURE 127 (trade name, manufactured by Ciba Specialty Chemicals, Inc.) | 1.5 parts by weight |
| Polyacrylic acid-polyacrylic acid dimethylamino ethyl ester partially neutralized salt (neutralized with NaOH and HCl, crosslinked, water-absorptive) | 10 parts by weight |

The above components are mixed and dispersed by use of a ball mill, and an "image recording composition" having a viscosity of 4,500 mPa·s is obtained.

Example 10

The image recording composition is prepared in accordance with the following process. Printing is performed in a similar manner to Example 1, except that the thus prepared image recording composition is used.

| Image recording composition | |
|---|---|
| Polyurethane acrylate | 40 parts by weight |
| 1,6-hexanediol diacrylate | 30 parts by weight |
| DAROCURE 1173 (trade name, manufactured by Ciba Specialty Chemicals, Inc.) | 1.0 part by weight |
| Polyacrylic acid partially neutralized salt (neutralized with NaOH, crosslinked, water-absorptive) | 30 parts by weight |

The above components are mixed and dispersed by use of a ball mill and an "image recording composition" having a viscosity of 4,500 mPa·s is obtained.

Evaluation

The Examples and Comparative Example are evaluated in the following manner. The results are shown in Table 1.

Evaluation of Ink Blurring

Printing is performed, and a portion corresponding to a character on the printed material is visually evaluated. The evaluation criteria are as follows, and prints with grade G1 or G2 are considered to be acceptable in practical use.

G1: Blurring in the character is not observed.
G2: Blurring in the character is slightly observed, but is acceptable in practical use.
G3: Blurring in the character is distinctly observed.

Evaluation of Fixing Properties

The image area is rubbed with a finger one minute after the printing, and the fixing properties are judged according to a stain on the finger. The evaluation criteria are as follows, and prints with grade G1 or G2 are considered to be acceptable in practical use.

G1: Stain is not observed on the finger.
G2: Stain is slightly observed on the finger.
G3: Stain is distinctly observed on the finger.

Evaluation of Coating Properties

The coating properties are evaluated in such a manner that a layer with a thickness of 10 µm is formed on a fluorine-coated resin belt by means of a roll coater, and the conditions of the layer are visually observed. The evaluation criteria are as follows.

G1: A uniform coated layer without particularly noticeable irregularities is formed.
G2: A coated layer with irregularities and unevenness only in a small portion thereof is formed.
G3: A coated layer with irregularities in a large portion thereof so that image disturbance occurs to a great extent is formed.

Evaluation of Storage Stability

After storing the image recording compositions for six months, evaluation of the ink blurring and the coating properties as described above is performed in a manner similar to the above.

TABLE 1

| | Blurring | Fixing Properties | Coating Properties | Storage Storability (Blurring) | Storage Storability (Coating Properties) |
|---|---|---|---|---|---|
| Example 1 | G1 | G1 | G1 | G1 | G1 |
| Comparative Example 1 | G3 | G1 | G1 | G3 | G1 |
| Example 2 | G1 | G1 | G1 | G1 | G1 |
| Example 3 | G1 | G1 | G2 | G1 | G2 |
| Example 4 | G2 | G1 | G1 | G2 | G1 |
| Example 5 | G2 | G1 | G1 | G2 | G1 |
| Example 6 | G1 | G2 | G2 | G1 | G2 |
| Example 7 | G2 | G2 | G1 | G2 | G1 |
| Example 8 | G1 | G1 | G1 | G1 | G1 |
| Example 9 | G1 | G1 | G1 | G1 | G1 |
| Example 10 | G1 | G1 | G2 | G2 | G3 |

As can be seen from the above results, the blurring, fixing properties, coating properties and storage storability of the Examples 1 to 10 are superior to those of Comparative example 1.

All publications, patent applications, and technical standards mentioned in this specification are herein incorporated by reference to the same extent as if each individual publication, patent application, or technical standard was specifically and individually indicated to be incorporated by reference.

What is claimed is:

1. An image recording composition comprising: a curable material that is cured upon application of an external stimulus, and a cationic resin having a cationic functional group, wherein the cationic resin is at least one selected from the group consisting of polyamine-based compounds, poly (meth)acrylic acid dimethylamino methyl ester compounds, cation-modified polyacrylamide-based compounds, a polyvinyl pyridine, a polyvinyl amidine, polymers modified with a quaternary ammonium salt, and guanidine polymers.

2. The image recording composition according to claim 1, wherein the cationic resin is a crosslinked resin.

3. The image recording composition according to claim 1, wherein the cationic resin is a liquid absorptive resin.

4. The image recording composition according to claim 1, wherein the content of the cationic resin is from about 5% by weight to about 50% by weight with respect to the total amount of the composition.

5. The image recording composition according to claim 1, wherein the curable material is selected from the group consisting of an ultraviolet-ray-curable material that is cured upon irradiation with ultraviolet rays, an electron-beam-curable material that is cured upon irradiation with electron beams, and a thermally curable material that is cured with heat.

6. An image recording ink set comprising the image recording composition according to claim 1 and an ink.

7. The image recording composition according to claim 1, wherein the cationic resin is one selected from a group consisting of a homopolymer of a monomer having a cationic functional group and a copolymer of monomers including a monomer having a cationic functional group.

8. The image recording composition according to claim 7, wherein the monomer having a cationic functional group is at least one selected from the group consisting of an allylamine, an ethyleneimine, a vinyl amine, a diallylamine, a dimethyl allylamine, an aminoalkyl acrylate, an aminoalkyl methacrylate, an acrylamino alkylamide, a methacrylamino alkylamide, a vinyl pyridine, a vinyl amidine, a diallyl dimethyl ammonium chloride, a diallyl methylethyl ammonium sulfate, an alkyl ammonium (meth)acrylate, guanidine, and hexamethylene biguanide.

9. The image recording composition according to claim 1, wherein the cationic functional group is at least one selected from the group consisting of an amine derivative, an onium salt derivative, a guanide derivative, a biguanide derivative, and a derivative of a heteroaromatic ring containing a nitrogen atom.

10. A recording apparatus comprising:
an intermediate transfer member,
a supply unit that supplies an image recording composition to the intermediate transfer member, the image recording composition containing a curable material that is cured upon application of an external stimulus, and a cationic resin having a cationic functional group, wherein the cationic resin is at least one selected from the group consisting of polyamine-based compounds, poly(meth)acrylic acid dimethylamino methyl ester compounds, cation-modified polyacrylamide-based compounds, a polyvinyl pyridine, a polyvinyl amidine, polymers modified with a quaternary ammonium salt, and guanidine polymers,
an ejection unit that ejects an ink to a curable layer formed from the image recording composition that has been supplied onto the intermediate transfer member,
a transfer unit that transfers the curable layer from the intermediate transfer member to a recording medium,
and a stimulus application unit that applies a stimulus that cures the curable layer.

11. The recording apparatus according to claim 10, wherein the cationic resin contained in the image recording composition is a crosslinked resin.

12. The recording apparatus according to claim 10, wherein the cationic resin contained in the image recording composition is a liquid absorptive resin.

13. The recording apparatus according to claim 10, wherein the content of the cationic resin in the image recording composition is from about 5% by weight to about 50% by weight with respect to the total amount of the composition.

14. The recording apparatus according to claim 10, wherein the curable material contained in the image recording composition is selected from the group consisting of an ultraviolet-ray-curable material that is cured upon irradiation with ultraviolet rays, an electron-beam-curable material that is cured upon irradiation with electron beams, and a thermally curable material that is cured with heat.

15. A recording apparatus comprising:
a supply unit that supplies an image recording composition to a recording medium, the image recording composition containing a curable material that is cured upon application of an external stimulus, and a cationic resin having a cationic functional group, wherein the cationic resin is at least one selected from the group consisting of polyamine-based compounds, poly(meth)acrylic acid dimethylamino methyl ester compounds, cation-modified polyacrylamide-based compounds, a polyvinyl pyridine, a polyvinyl amidine, polymers modified with a quaternary ammonium salt, and guanidine polymers;
an ejection unit that ejects an ink to a curable layer formed from the image recording composition that has been supplied onto the recording medium;
and a stimulus application unit that applies a stimulus that cures the curable layer.

16. The recording apparatus according to claim 15, wherein the cationic resin contained in the image recording composition is a crosslinked resin.

17. The recording apparatus according to claim 15, wherein the cationic resin contained in the image recording composition is a liquid absorptive resin.

18. The recording apparatus according to claim 15, wherein the content of the cationic resin in the image recording composition is from about 5% by weight to about 50% by weight with respect to the total amount of the composition.

19. The recording apparatus according to claim 15, wherein the curable material contained in the image recording composition is selected from the group consisting of an ultraviolet-ray-curable material that is cured upon irradiation with ultraviolet rays, an electron-beam-curable material that is cured upon irradiation with electron beams, and a thermally curable material that is cured with heat.

* * * * *